(12) United States Patent
Yin et al.

(10) Patent No.: US 9,405,960 B2
(45) Date of Patent: Aug. 2, 2016

(54) FACE HALLUCINATION USING CONVOLUTIONAL NEURAL NETWORKS

(71) Applicant: Beijing Kuangshi Technology Co., Ltd., Beijing (CN)

(72) Inventors: Qi Yin, Beijing (CN); Zhimin Cao, Beijing (CN); Erjin Zhou, Beijing (CN)

(73) Assignee: Beijing Kuangshi Technology Co., Ltd., Beijing (CN)

( * ) Notice: Subject to any disclaimer, the term of this patent is extended or adjusted under 35 U.S.C. 154(b) by 27 days.

(21) Appl. No.: 14/375,683

(22) PCT Filed: Jun. 17, 2014

(86) PCT No.: PCT/CN2014/080086
§ 371 (c)(1),
(2) Date: Jul. 30, 2014

(87) PCT Pub. No.: WO2015/192316
PCT Pub. Date: Dec. 23, 2015

(65) Prior Publication Data
US 2015/0363634 A1   Dec. 17, 2015

(51) Int. Cl.
*G06K 9/62* (2006.01)
*G06K 9/40* (2006.01)
*G06K 9/00* (2006.01)
*G06K 9/66* (2006.01)

(52) U.S. Cl.
CPC .............. *G06K 9/00221* (2013.01); *G06K 9/66* (2013.01)

(58) Field of Classification Search
CPC . G06K 9/00221; G06K 9/66; G06K 9/00228; G06K 9/00288; G06K 9/00281; G06K 9/00248

USPC ......... 382/118, 156, 155, 168, 255, 263, 264, 382/274, 275
See application file for complete search history.

(56) References Cited

U.S. PATENT DOCUMENTS

| 8,081,842 | B2 * | 12/2011 | Lu | H04N 19/172 |
| | | | | 345/660 |
| 8,270,772 | B2 * | 9/2012 | Lu | H04N 19/172 |
| | | | | 345/660 |
| 2011/0293189 | A1 * | 12/2011 | Sun | G06K 9/6247 |
| | | | | 382/195 |
| 2012/0288166 | A1 * | 11/2012 | Sun | G06K 9/00281 |
| | | | | 382/118 |
| 2012/0288167 | A1 * | 11/2012 | Sun | G06K 9/00281 |
| | | | | 382/118 |

OTHER PUBLICATIONS

Yang, C. et al., "Structured Face Hallucination," 2013 IEEE Conference on Computer Vision and Pattern Recognition, pp. 1099-1106. Jun. 6, 23-28, 2013.*
Sun, Y. et al., "Deep Convolutional Network Cascade for Facial Point Detection," The Chinese University of Hong Kong, eight pages. Jun. 6, 23-28, 2013.*
Yang, C. et al., "Structured Face Hallucination," 2013 IEEE Conference on Computer Vision and Pattern Recognition, pp. 1099-1106.

(Continued)

*Primary Examiner* — Sheela C Chawan
(74) *Attorney, Agent, or Firm* — Fenwick & West LLP (57) ABSTRACT

Face hallucination using a bi-channel deep convolutional neural network (BCNN), which can adaptively fuse two channels of information. In one example, the BCNN is implemented to extract high level features from an input image. The extracted high level features are combined with low level details in the input image to produce the higher resolution image. Preferably, a proper coefficient is obtained to adaptively combine the high level features and the low level details.

18 Claims, 7 Drawing Sheets

(56) References Cited

OTHER PUBLICATIONS

Yang, J. et al., "Image Super-Resolution Via Sparse Representation," IEEE Transactions on Image Processing, Nov. 2010, pp. 2861-2873, vol. 19, No. 11.

Yang, J. et al., "Image Super-Resolution as Sparse Representation of Raw Image Patches," University of Illinois at Urbana-Champagin, Beckman Institute, and Coordinated Science Laboratory, eight pages.

* cited by examiner

FACE HALLUCINATION USING CONVOLUTIONAL NEURAL NETWORKS

FIELD OF THE INVENTION

This invention relates generally to image processing and, more particularly, to generating higher resolution face images.

DESCRIPTION OF THE RELATED ART

Face recognition systems perform image processing on digital images or video frames to automatically identify people. The performance of some face recognition approaches may depend heavily on the resolution of face images. For example, a detectable face captured in standard-definition surveillance videos may only be 12 by 12 pixels or lower resolutions. Such low-resolution face images may degrade the performance of face recognition and analysis. To improve the performance of face recognition and analysis on low resolution face images, face hallucination is performed to infer face images with higher resolutions.

In one approach, low level features are obtained to perform face hallucination. For example, the choice of global Eigen faces or local texture patches have been examined as the low level features. However, the low level features typically are not robust to variations in appearance, such as varying conditions of pose, resolution degree, and motion blur. As a result, this approach is often limited to reconstructing frontal face images under constrained conditions.

In another approach, a large scale set of high resolution training faces with various poses and expressions are used to perform face hallucination. For example, low resolution testing faces are generated based on various poses and expressions. However, this approach may not properly generate higher resolution face images in case a highly similar face is not found in the training set. Furthermore, face hallucination performed in this approach may not work properly if the low resolution face images are blurred, because the blurred patches may not be descriptive enough.

In yet another approach, the structural information of facial components is implemented to perform face hallucination. For example, instead of the low level features, the structural information of facial components is implemented for matching patches. This approach depends heavily on accurate facial landmarks to capture the structural information. However, capturing the structural information from low resolution face images is difficult. Moreover, face hallucination performed in this approach may not work properly if the low resolution face images are blurred.

Thus, there is a need for better approaches to perform face hallucination for face recognition and other purposes.

SUMMARY

The present invention overcomes the limitations of the prior art by generating a higher resolution face image from a lower resolution face image. For convenience, the higher resolution face image may sometimes be referred to as a hallucinated face image. One approach adaptively combines low level information and high level information to reconstruct the hallucinated face image in a higher resolution. The low level information is deduced from the raw input face image and the high level information is obtained from an intermediate hallucinated face image. Synthesizing the raw input image and the intermediate hallucinated face image leads to improved accuracy on the final hallucinated image (i.e., output face image or reconstructed image).

One aspect includes a system for generating higher resolution output face images from input face images. In one approach, the system includes a convolutional neural network (CNN) that generates a face representation of an input face image. The CNN includes convolution, non-linearity, and down-sampling. The system also includes a face hallucinator that generates a hallucinated face image from the face representation. The hallucinated face image has a higher resolution than the input face image. Additionally, the system includes a face combiner that combines the hallucinated face image with an up-sampled version of the input face image to produce an output face image.

In an example implementation, the system includes a coefficient estimator that generates a coefficient from the face representation. In one approach, the face combiner generates the output face image as a linear combination of the hallucinated face image and the up-sampled version of the input face image, where the coefficient determines the linear combination. The coefficient estimator may be a neural network that generates the coefficient from the face representation. Preferably, the coefficient estimator is a fully-connected neural network.

Other aspects include components, devices, systems, improvements, methods, processes, applications and other technologies related to the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A disclosed facial recognition system and method performs face hallucination. In one approach, the face hallucination is based on synthesizing low level information and high level information of an input face image. In one aspect, the face hallucination implements deep convolutional neural network (CNN) to infer a higher resolution image from a low resolution input image. The deep CNN is implemented to extract high level features from the input image. The extracted high level features are combined with low level details in the input image to produce the higher resolution image. Preferably, a coefficient is obtained to adaptively combine the high level features and the low level details. The face hallucination performed in this approach is capable of handling images with large variations in appearance (e.g., varying conditions of pose, resolution degree, and motion blur) without relying on facial landmarks.

Face Recognition Overview

Figure 1:
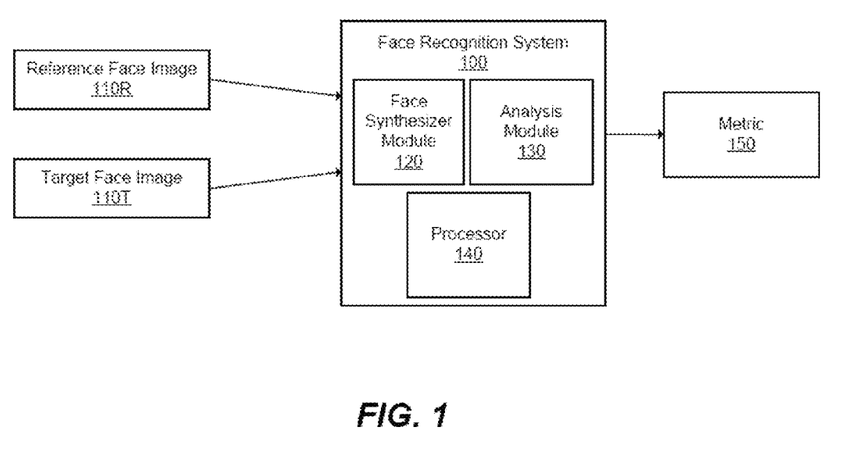
FIG. 1 is a simplified diagram of a face recognition system.

FIG. 1 is a simplified diagram of a face recognition system 100, according to one embodiment. The face recognition system 100 receives a target face image 110T in a low resolution (e.g., 15 by 15 pixels) and tries to recognize the face (i.e., associate the face with a specific individual). The face recognition system 100 also receives a reference face image 110R for a known individual. The reference face image 110R may have the same or different resolution compared to the target face image 110T. If the target face image 110T is low resolution, then often the reference face image 110R will have a higher resolution. The face recognition system 100 performs analysis to generate a metric 150 to indicate whether the individual in the target face image 110T is the same as the individual in the reference face image 110R. The face recognition system 100 may have a large database of reference face images 110R for different individuals and may compare the target face image 110T to many different reference face images 110R in order to identify the individual for the target face image 110T.

The face recognition system 100 includes a face synthesizer module 120, an analysis module 130, and a processor 140. The face recognition system 100 may also include a landmark detection module (not shown) that detects face landmarks from the output of the face synthesizer module 120. Each of these modules may be embodied as hardware, software, firmware, or a combination thereof. Together, these modules perform face recognition and determine whether the subjects in two face images 110 are identical or not.

The face synthesizer module 120 receives the target face image 110T in a low resolution as an input and generates a higher resolution image (i.e., a hallucinated image) as an output. In one approach, the face synthesizer module 120 is implemented as a bi-channel convolutional neural network (BCNN) to infer the higher resolution image. In one aspect, one channel of the BCNN is trained to obtain an intermediate hallucinated face image of the target face image 110T, and another channel of the BCNN is trained to obtain a coefficient. The BCNN adaptively combines the target face image 110T and the intermediate hallucinated face image based on the coefficient to produce the higher resolution image as the output.

The analysis module 130 determines whether a subject in the reference face image 110R and a subject in the target face image 110T match. The analysis module 130 obtains the higher resolution face images from the face synthesizer module 120. For face images that were previously available, face hallucination may be performed in advance, in which case the analysis module 130 may retrieve hallucinated images from a database. Further, the analysis module 130 may generate metric 150 on whether the face images 110 belong to the same subject (person) based on the representations of the face images 110 or the hallucinated images. The metric 150 can be used to perform face recognition.

The processor 140 executes instructions to perform face recognition on the face recognition system 100. The processor 140 receives instructions from memory (not shown), or external circuitry. The instructions may also reside, completely or at least partially, within the processor 140 (e.g., within a processor's cache memory). According to the instructions, the processor 140 transforms or selects a portion of the face images 110 to provide to the face synthesizer module 120. In addition, the processor 140 operates the face synthesizer module 120 and the analysis module 130 according to the instructions to perform core functions of the face recognition.

Face Hallucination

Figure 2:
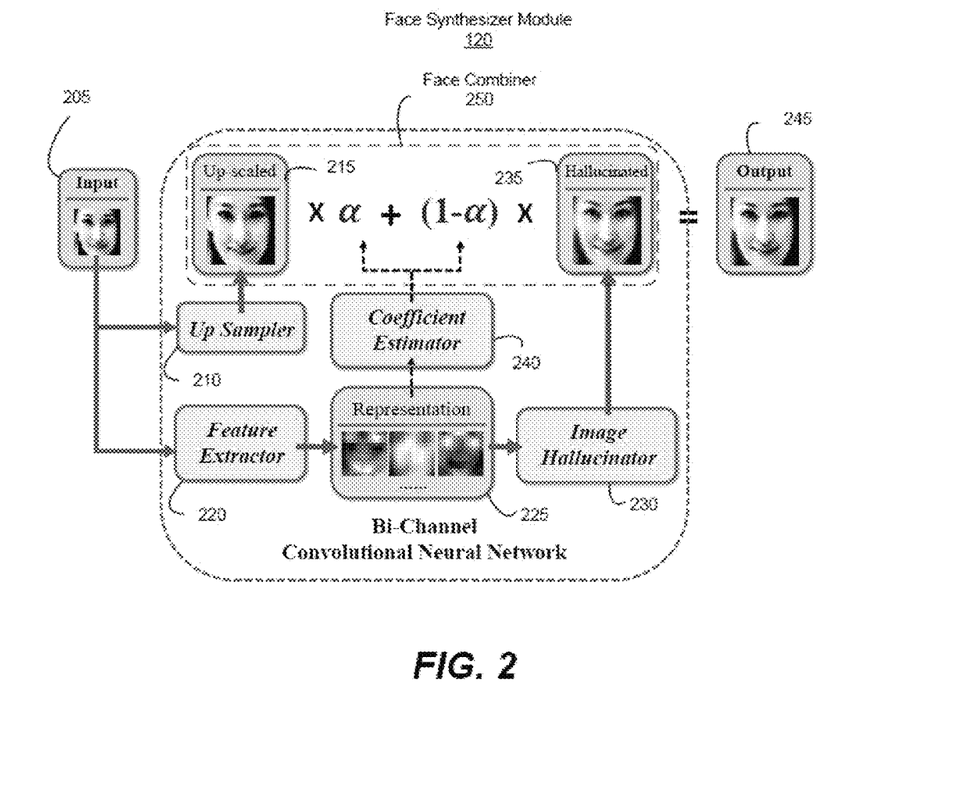
FIG. 2 is a diagram of an example face synthesizer module.

FIG. 2 is a diagram of an example face synthesizer module 120. The face synthesizer module 120 receives an input face image 205 in a low resolution and performs face hallucination to generate an output face image 245 in a higher resolution. For a given low resolution (LR) input face image 205 $\mathcal{I}_L$, the face synthesizer module 120 generates a high resolution (HR) output face image 245 $f(\mathcal{I}_L, W)$ which preferably is close to the ground truth $\mathcal{I}_H$. In one approach, this is done to minimize errors, $$\min \|f(\mathcal{I}_L, W) - \mathcal{I}_H\|_2 \tag{1}$$

where W represents the parameters of the face synthesizer module 120 and $f(\ )$ represents the function of the face synthesizer module 120.

In this example, the face synthesizer module 120 trains multiple layers of CNN to obtain an accurate output face image 245 in a higher resolution. In one implementation, the face synthesizer module 120 includes at least two channels of CNN. That is, it includes a bi-channel CNN (BCNN). Information from each of the channels is combined to produce the output face image 245 in a higher resolution.

In an exemplary embodiment, the face synthesizer module 120 includes an up-sampler module 210, a feature extractor module 220, an image hallucinator module 230 (herein also referred to as a face hallucinator module or a face hallucinator), a coefficient estimator module 240, and a face combiner module 250. Together, these modules form at least two channels of CNNs to generate the output face image 245. For example, the feature extractor module 220 and the image hallucinator module 230 form one CNN channel to generate an intermediate hallucinated face image 235. In addition, the feature extractor module 220 and the coefficient estimator module 240 form another CNN channel to generate a coefficient α. The face combiner module 250 makes a linear combination of the intermediate hallucinated face image 235 with an up-sampled version 215 of the input face image to produce the output face image 245. The relative weighting is determined by the coefficient α. Each of these components may be embodied as hardware, software, firmware, or a combination thereof.

The feature extractor module 220 generates a face representation 225 of the input face image 205. In one approach, the feature extractor module 220 is implemented as a CNN. The CNN is trained to extract features from the input face image 205. In one approach, the feature extractor module 220 trains networks to identify robust global structure of the input face image 205 for the purposes of face hallucination. For example, the feature extractor module 220 extracts features (e.g., corner, edge, gradient, eyes, nose, and mouth). The features extracted are used to generate a representation 225 of the input face image 205.

The image hallucinator module 230 receives the face representation 225 from the feature extractor module 220 and generates the intermediate hallucinated face image 235. Preferably, the image hallucinator module 230 is implemented with neural networks that are fully connected. The image hallucinator module 230 and the feature extractor module 220 form a first CNN channel. The intermediate hallucinated face image 235 has a higher resolution than the input face image 205.

The intermediate hallucinated face image 235 can include more low level details (e.g., high frequency or sharp transition in images) than the input face image 205, particularly if the input face image 205 is poor quality such as very low resolution or blurred. However, if the input face image 205 has good quality, then the feature extractor module 220 may filter out low level details in order to identify the robust global structure of the input face image 205. As a result, in this case, the intermediate hallucinated face image 235 may have fewer low level details than the input face image 205.

To compensate for the possible deficiency in the intermediate hallucinated face image 235, the face synthesizer module 120 calculates a coefficient α to synthesize information related to both the raw input face image 205 and the intermediate hallucinated face image 235 to produce the final output face image 245 according to $$f(\hat{I}_L, W) = \alpha \uparrow \hat{I}_L + (1-\alpha)\tilde{f}(\hat{I}_L, W). \quad (2)$$

Here, $\hat{I}_L$ represents the low resolution input face image 205, and W represents the parameters of neural networks in the face synthesizer module 120 (e.g., in modules 220, 230 and 240). In addition, $\tilde{f}(\hat{I}_L, W)$ denotes the intermediate hallucinated image 235 produced by the first CNN channel from the input, and ↑ represents up-sampling so $\alpha \uparrow \hat{I}_L$ represents the up-sampled version 215 of the input image. The second CNN channel produces the coefficient α.

The coefficient estimator module 240 receives the face representation 225 from the feature extractor module 220 and generates the coefficient α to compensate for any deficiency in the intermediate hallucinated face image 235 (or to take advantage of additional useful information in the original input face image). Preferably, the coefficient estimator module 240 is implemented as neural networks that are fully connected. The coefficient estimator module 240 and the feature extractor module form a second CNN channel. The coefficient α is used to more intelligently combine high level features generated in the intermediate hallucinated face image 235 with low level details that might exist in the input face image 205.

For proper integration of the input face image 205 and the intermediate hallucinated face image 235, the up-sampler module 210 up-samples the input face image 205, because the intermediate hallucinated face image 235 has a higher resolution than the input face image 205. Preferably, the up-sampler module 210 up-samples the input face image 205 such that the resolution of the intermediate hallucinated face image 235 matches the resolution of the up-sampled input face image 205. In one implementation, bicubic interpolation is used to generate the up-sampled version.

The face combiner module 250 combines the intermediate hallucinated face image 235 with the up-sampled version 215 of the input face image to produce the output face image 245. In one approach, the face combiner module 250 generates the output face image 245 as a linear combination of intermediate hallucinated face image 235 and the up-sampled version 215 of the input face image. Preferably, the coefficient α determines the linear combination. Alternatively, the face combiner module 250 may combine the intermediate hallucinated face image 235 with the up-sampled version 215 of the input face image in a non-linear manner. Alternatively and additionally, the face combiner module 250 may combine images or information obtained through multiple channels of CNN.

Figure 3:
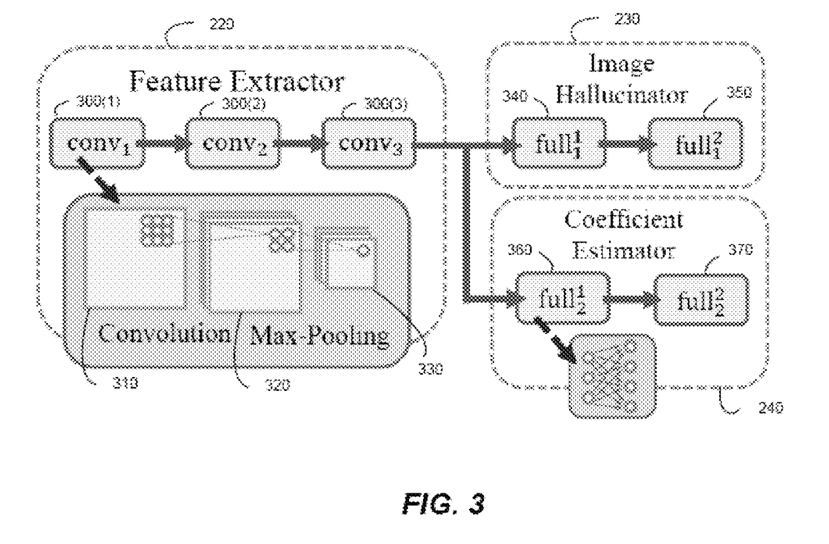
FIG. 3 is a diagram of an example bi-channel convolutional neural network.

FIG. 3 is a diagram illustrating the BCNN implemented in the face synthesizer module 120. As illustrated in FIG. 3, the feature extractor module 220 and the image hallucinator module 230 form the first channel of the BCNN, and the feature extractor module 220 and the coefficient estimator module 240 form the second channel of the BCNN. Together, these components implement multiple layers of neural networks for generating the coefficient α and the intermediate hallucinated face image 235.

To accurately generate the output face image 245, the BCNN trains the neural networks according to an objective function $$\operatorname*{argmin}_{W} \frac{1}{N} \sum_{i=1}^{N} \left\| \left\{ \alpha(\hat{I}_L, W) \uparrow \hat{I}_{L_i} + [1 - \alpha(\hat{I}_L, W)] \tilde{f}(\hat{I}_{L_i}, W) \right\} - I_{H_i} \right\|_2 \quad (3)$$

for a given training set $D = \{(I_{L_1}, I_{H_1}), (I_{L_2}, I_{H_2}), \ldots, (I_{L_N}, I_{H_N})\}$. The parameters W are determined by minimizing the error function in Eq. 3.

In one approach, the feature extractor module 220 includes a CNN with two or more CNN layers in a cascade progressing from lower level features to higher level features. Preferably, the CNN includes three CNN layers 300(1), 300(2), and 300(3) (generally referred to herein as CNN layer 300). For example, the first CNN layer 300(1) may detect low level features like corner, edge and gradient. The second CNN layer 300(2) may combine these low level features to extract higher level features such as shapes. The third CNN layer 300(3) may extract more complex structures such as eyes, nose, and mouth.

In one example embodiment, each CNN layer 300 includes a convolution filter 310, a nonlinear activation operator 320, and a down-sampling layer 330 (e.g., max pooling). Each CNN layer 300 is trained according to the objective function. In other embodiments, each CNN layer 300 may include different or additional elements. In addition, the functions may be distributed among elements in a different manner than described herein.

In each CNN layer i, the feature $I_i^{(j)}$ maps are obtained by convolving the linear filters $f_i^{(k,j)}$ with the previous feature $I_{i-1}^{(k)}$ and adding the bias term $b_i^{(j)}$, in the convolution filter 310. Then the feature maps propagate through a non-linear function, e.g. tan h, in the nonlinear activation operator 320, and are down-sampled with the max-pooling layer 330. $n_i$ denotes the number of feature maps in the layer i and the size of each feature map is $s_i \times s_i$. The filter size is $w_i \times w_i$ and the pooling layer chooses the maximum value on every 2×2 non-overlapping sub-regions. The operations are formulated in Eq. 4, where M denotes the max-pooling operator.

$$I_i^{(j)} = M \tanh\left(\sum_{k=1}^{n_{j-1}} I_{i-1}^{(k)} \otimes f_i^{(k,j)} + b_i^{(j)}\right) \quad (4)$$

Each of the image hallucinator module 230 and the coefficient estimator module 240 includes neural networks that are fully connected. Hence, neural networks in the image hallucinator module 230 form one group and neural networks in the coefficient estimator module 240 form another group. For example, two neural network layers 340 and 350 in the image hallucinator module 230 form a first group, and two neural network layers 360 and 370 in the coefficient estimator module 240 form a second group. The neural networks in the first group and the second group generate a hallucinated image $I_{hal}$ and a coefficient α, respectively. The size of layer i in group j is denoted by $p_j^{(i)}$. Eq. 5 and 6 show the output for each group, where $W_i^{(1)}$ and $W_i^{(2)}$ represent the weighted matrices in group i.

$$I_{hal} = \tan h(W_1^{(2)} \tan h(W_1^{(1)} I_3 + b_1^{(1)}) + b_1^{(2)}) \quad (5)$$

$$\alpha = \frac{1}{2} \tan h(W_2^{(2)} \tan h(W_2^{(1)} I_3 + b_2^{(1)}) + b_2^{(2)}) + \frac{1}{2} \quad (6)$$

In one approach, the BCNN combines the up-sampled image $\uparrow I_{in}$ and the hallucinated image $I_{hal}$ linearly with the coefficient α in Eq. 11, which is the output of the system.

$$I_{out} = \alpha \uparrow I_{in} + (1-\alpha) I_{hal} \quad (7)$$

The coefficient α can be adaptively trained to receive the input face images 205 with different qualities. For example, as α approaches 1, the output face image 245 $I_{out}$ is approximately the up-sampled face image 215 (i.e., up-sampled version of the input face image), which means the input face image 205 has high quality and can support enough details. In contrast, when α approaches 0, the output is approximately the intermediate hallucinated face image 235, which means the input face image 205 has low quality and cannot provide useful texture. Hence, the coefficient α indicates the quality of the input face image 205.

Table 1 provides a summary of the network architectures in an example BCNN. The output size of the convolutional layer i is denoted by $n_i \times s_i \times s_i$ and the filter size is $n_{i-1} \times n_i \times w_i \times w_i$. The size of the fully-connected layer i in group j is $p_i^j \times 1$ and the corresponding weighted matrix is $p_i^j \times p_i^{(j-1)}$.

TABLE 1

Example implementation details in the network.

| Layer name | Input | Output | Output size $n_i \times s_i \times s_i$ | Filter size $n_{i-1} \times n_i \times w_i \times w_i$ |
|---|---|---|---|---|
| $conv_1$ | $I_{in}$ | $I_1$ | 32 × 22 × 22 | 1 × 32 × 5 × 5 |
| $conv_2$ | $I_1$ | $I_2$ | 64 × 10 × 10 | 32 × 64 × 3 × 3 |
| $conv_3$ | $I_2$ | $I_3$ | 128 × 4 × 4 | 64 × 128 × 3 × 3 |

| Layer name | Input | Output | Output size $P_i^j \times 1$ | Matrix size $p_i^j \times p_i^{(j-1)}$ |
|---|---|---|---|---|
| $full_1^{(1)}$ | $I_3$ | $I_4$ | 2000 × 1 | 2000 × 2048 |
| $full_1^{(2)}$ | $I_4$ | $I_{hal}$ | 10000 × 1 | 10000 × 2000 |
| $full_2^{(1)}$ | $I_3$ | $I_5$ | 100 × 1 | 100 × 2048 |
| $full_2^{(2)}$ | $I_5$ | | 1 × 1 | 1 × 100 |

In one embodiment, the output face image contains at least four times the number of pixels in the input face image (i.e., two times up-sampling in each linear dimension). Preferably, the input face image is less than 50×50 pixels and the output face image is at least 100×100 pixels. Smaller input face images can also be used, for example 20×20.

By implementing BCNN in the face synthesizer module 120, two channels of information are conjoined to generate an accurate output face image. The BCNN incorporates both high level features and low level details of an input image to achieve robustness and accuracy. Utilizing high level features allows the face synthesizer module 120 to be robust to large appearance variations or blurs. Utilizing low level details enables the face synthesizer module 120 to integrate local details with high frequency or sharp transitions in images. By training a neural network, two channels of information are adaptively fused.

Operation of Face Recognition

Figure 4:
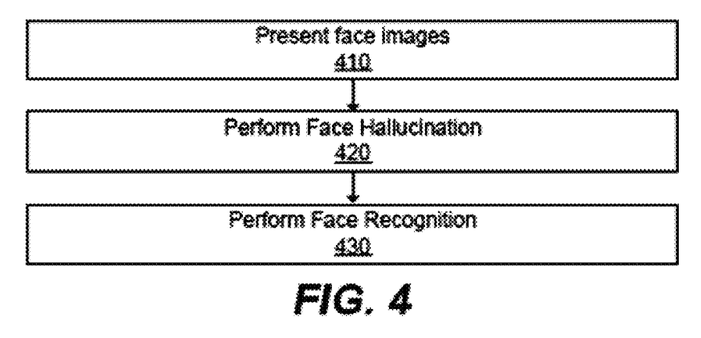
FIG. 4 is a flow diagram of a method of performing face recognition.

FIG. 4 illustrates a flow diagram of a method of performing face recognition using the face recognition system 100, according to one embodiment. The face recognition system 100 is presented 410 with face images. The face hallucination is performed 420 to generate a higher resolution output face image 245 from a lower resolution input face image 205. Face recognition is then performed 430 using the higher resolution output face image 245.

Figure 5:
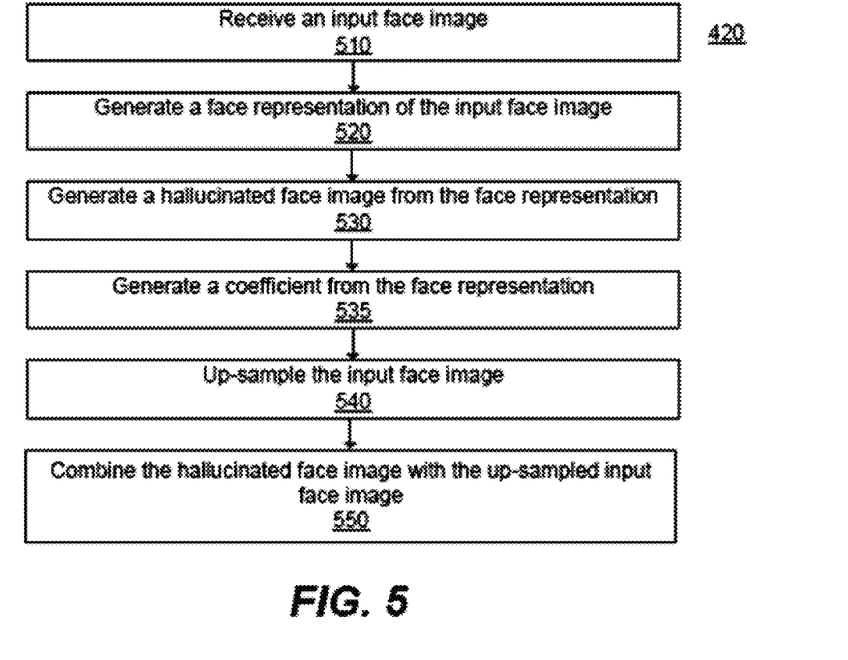
FIG. 5 is a flow diagram of a method of performing face hallucination.

FIG. 5 illustrates a flow diagram of a method of performing face hallucination 420. An input face image 205 is received 510 by a face synthesizer module 120. A face representation 225 of the input face image 205 is generated 520. Preferably, the face representation 225 of the input face image 205 is generated 520 using a convolutional neural network (CNN). An intermediate hallucinated face image 235 is generated 530 from the face representation of the input face image 205. In addition, a coefficient α is generated 535 from the face representation 225. In addition, the input face image is up-sampled 540. Preferably, the input face image 205 is up-sampled 540 such that the resolution of the up-sampled image 215 matches the resolution of the intermediate hallucinated face image 235. Further, the intermediate hallucinated face image 235 is combined 550 with the up-sampled face image 215 to generate an output face image 245. In one approach, the output hallucinated face image 245 is generated as a linear combination of the intermediate hallucinated face image 235 and the up-sampled face image 215, where the coefficient determines the weighting of the linear combination.

Simulation Results

Experiments were conducted to verify the performance of the face hallucination using the BCNN. For experiments, a large number of images are blurred to obtain low resolution input face images.

Low resolution input face images 205 are obtained using the following approach. Let $I_L$ and $I_H$ denote the low resolution (LR) input image 205 and the high resolution (HR) output face image 245. Obtaining blurred images from the LR input image 205 can be modeled as $$I_L = \downarrow (I_H \otimes G). \quad (8)$$

Here G is the blur kernel, ⊗ denotes the convolution operation and ↓ represents downsampling.

Among various types of blur kernels, Gaussian blur and motion blur are two effective kernels to model blurs in images. For example, Gaussian blur is widely appeared in images, such as the out-of-focus effect or aberration in the imaging system. Gaussian blur can be defined as:

$$(h \otimes g)(u, v) = \frac{1}{S_g} \int \int e^{\frac{-x^2}{2\sigma_x^2} + \frac{-y^2}{2\sigma_y^2}} h(u - x, v - y) dx dy, \quad (9)$$

where $\sigma_x, \sigma_y$ are variance parameters in the horizontal and vertical directions and $S_g$ is a normalization constant.

Motion blur is another common kernel that models blurs due to the motion in objects. The blur travels in a single direction and the kernel is controlled by two parameters θ, l, which represent the blur direction and the moving distance, respectively. The blurred image is normalized with the constant $S_M$.

$$(h \otimes g)(u, v) = \frac{1}{S_m} \int_\theta^l h(u + t\cos\theta, v + t\sin\theta) dt. \quad (10)$$

Figure 6:
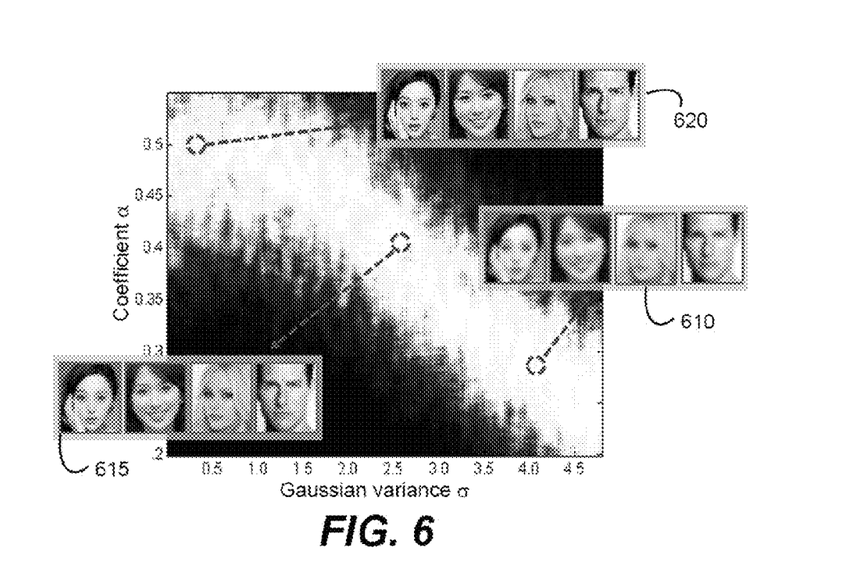
FIG. 6 plots the probability density functions of coefficients α for different Gaussian blurs.

FIG. 6 plots the probability density functions of the coefficient α for different amounts of Gaussian blur $\sigma = \sigma_x = \sigma_y$. 30,000 images are selected from the test set with different Gaussian kernels. Some examples of blurred face images are shown in strips 610, 615 and 620. FIG. 6 shows the probability density in gray scale. White represents high probability and black represents low probability. FIG. 6 illustrates that the coefficient α is correlated with the Gaussian variances. As the variance increases (e.g., σ=4), the input face image 610 becomes blurrier and the probability density function for coefficient α shifts to lower values of α. Hence, the coefficient α indicates the input face image 610 has low quality and cannot provide useful texture. On the other hand, as the variance decreases (e.g., σ<0.5), the input face image 620 becomes clearer and the probability density function for coefficient α shifts towards larger values. Thus, the coefficient α indicates the input face image 620 has higher quality and can support enough details. In the example BCNN, when the input face images 620 contain substantially no blur (i.e., the Gaussian variance is substantially equal to 0), the probability density function of coefficient α peaks around 0.5 rather than 1. This is because even with no Gaussian blur, the size of the input face image 205 limits the image quality.

Figure 7:
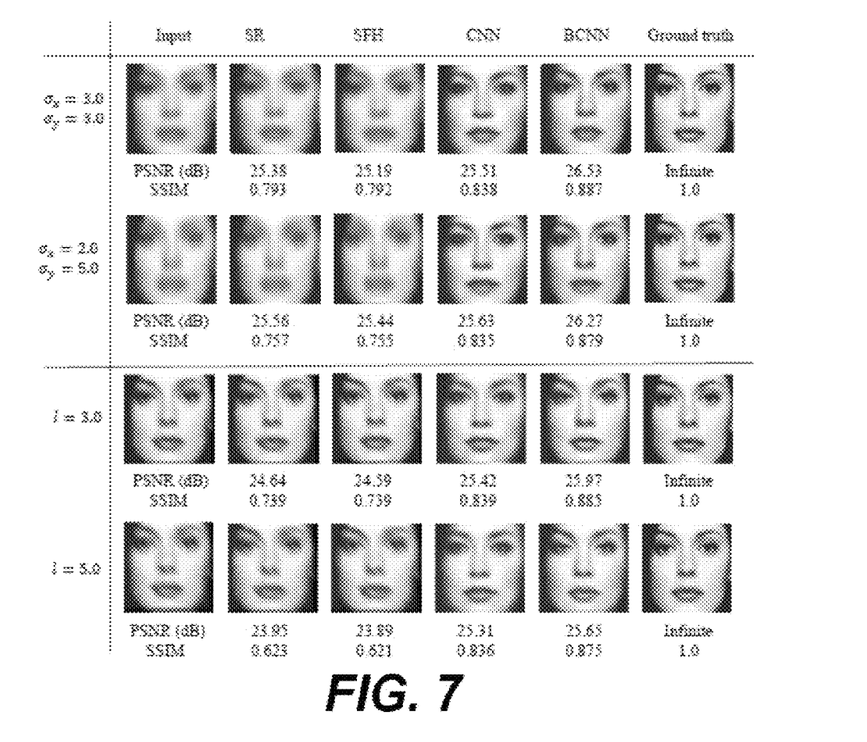
FIG. 7 illustrates qualitative comparisons of various face hallucinations on an input face image with different Gaussian blurs and motion blurs.

FIG. 7 illustrates qualitative comparisons of various face hallucinations on an input face image with different Gaussian blurs and motion blurs. For comparisons, a low resolution input face image is obtained by performing Gaussian blurs or motion blurs on the test image. The top two rows show performances of various types of face hallucinations on the Gaussian blurred face images. The bottom two rows show performances of various types of face hallucinations on the motion blurred face images. Further, the low resolution face image is down-sampled to 40 by 40 pixels to mimic poor quality images captured in the wild. The qualities of the reconstructed output face images are analyzed by comparing PSNR and structural similarity (SSIM).

The columns in FIG. 7 are the following. The leftmost column "Input" is the down-sampled lower resolution input image. The rightmost column "Ground truth" is the high resolution image which is used to generate the blurred and down-sampled Inputs. The middle four columns are different types of face hallucination. From left to right, "SR" is based on superresolution. See Yang, J., Wright, J., Huang, T. S., Ma, Y.: Image super-resolution via sparse representation. Image Processing, IEEE Transactions on 19(11) (2010) 2861-2873; and Yang, J., Wright, J., Huang, T., Ma, Y.: Image super-resolution as sparse representation of raw image patches. In: Computer Vision and Pattern Recognition, 2008. CVPR 2008. IEEE Conference on, IEEE (2008) 1-8. "SFH" is based on another state of the art face hallucination approach. See Yang, C. Y., Liu, S., Yang, M. H.: Structured face hallucination. In: Computer Vision and Pattern Recognition (CVPR), 2013 IEEE Conference on, IEEE (2013) 1099-1106. "CNN" is based on a pure convolutional neural network. "BCNN" is the bi-channel convolutional neural network approach described above.

In FIG. 7, the conventional face hallucination methods (SR and SFH) fail when the input face images are distinctively blurred. The patch-based method SR method fails to reconstruct clear images, because the patches in the images are polluted and the method does not learn the high-level structures from the input. The landmark based method SFH method also fails to reconstruct clear images, because accurate landmarks cannot be obtained on blurred images.

Table 2 contains the average results of PSNR and SSIM on the test set. Table 2 shows that face hallucination performed using the BCNN outperforms other methods.

TABLE 2

Qualitative comparison of face hallucination using various methods

|  | SR | CNN | BCNN |
|---|---|---|---|
| PSNR (dB) | | | |
| $\sigma_x = 3, \sigma_y = 3$ | 24.39 | 24.50 | 25.01 |
| $\sigma_x = 2, \sigma_y = 5$ | 24.40 | 24.51 | 24.90 |
| l = 3 | 24.38 | 24.44 | 24.84 |
| l = 5 | 23.97 | 24.24 | 24.37 |
| SSIM | | | |
| $\sigma_x = 3, \sigma_y = 3$ | 0.6099 | 0.6226 | 0.6924 |
| $\sigma_x = 2, \sigma_y = 5$ | 0.5756 | 0.6130 | 0.6721 |
| l = 3 | 0.5801 | 0.6323 | 0.7081 |
| l = 5 | 0.4565 | 0.6243 | 0.6801 |

The face hallucination using the BCNN can be implemented as a pre-processing function that significantly improves the performance of the following face applications. For example, the hallucinated face image can be used in facial landmark detection or in face recognition.

Figure 8:
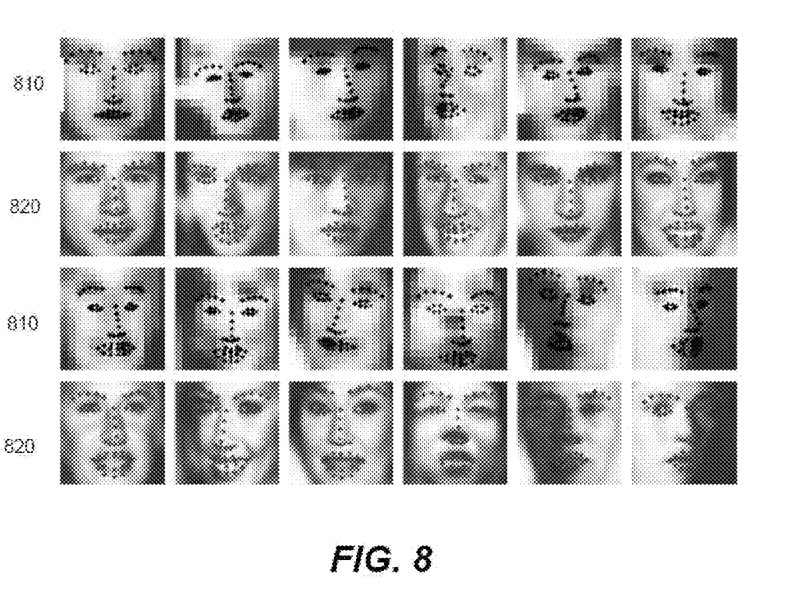
FIG. 8 shows examples with landmark detection performed on low resolution input face images and high resolution output face images.

FIG. 8 shows examples with landmark detection performed on low resolution input face images and high resolution output face images. This figure contains 12 different faces. Row 810 contains a low resolution input face image obtained using Gaussian blur. The markets in row 810 are the landmarks detected based on the low resolution image. Immediately below each low resolution image 810 is a corresponding hallucinated image 820. The markers illustrate landmark detections performed on the high resolution output face images. Landmark detections performed on the low resolution images 810 fail to locate accurate positions of inner face components (e.g., eyebrows, eyes, nose and mouth). However, landmark detections performed on the high resolution images 820 accurately locate inner face components such as eyebrows, eyes, nose, and mouth. Therefore, the face hallucination using the BCNN improves performance of facial landmark detection.

Figure 9A:
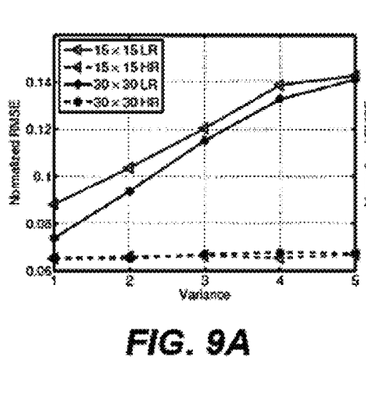
FIG. 9A plots errors in the landmark detection on input face images with Gaussian blurs and on hallucinated face images.
Figure 9B:
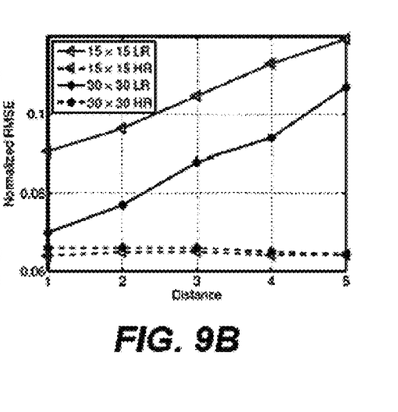
FIG. 9B plots errors in the landmark detection on input face images with motion blurs and on hallucinated face images.

FIGS. 9A and 9B further corroborate the improved performance of the facial landmark detection using the BCNN. FIG. 9A plots normalized errors in the landmark detection on raw input face images with Gaussian blurs and hallucinated output face images. Similarly, FIG. 9B plots normalized errors in the landmark detection on raw input face images with motion blurs and hallucinated output face images. In FIGS. 9A and 9B, two different resolutions (15 by 15, 30 by 30) of images are tested. When the landmark detector predicts the landmark positions, the root mean square error (RMSE) is calculated, and then the RMSE is normalized with the distance between the eye-corners. In this example, the landmark detector is described in Asthana, A., Zafeiriou, S., Cheng, S., Pantic, M.: Robust discriminative response map fitting with constrained local models. In: Computer Vision and Pattern Recognition (CVPR), 2013 IEEE Conference on, IEEE (2013) 3444-3451, although many different types of landmark detectors can be used.

In FIG. 9A, standard Gaussian filters ($\sigma_x = \sigma_y = \sigma$) with different standard deviations $\sigma = 1.0, 2.0, \ldots, 5.0$ are added on each low resolution image, then the landmark detector is directly applied to the low resolution blurred images LR and reconstructed images HR based on face hallucination using the BCNN. The landmark detection on reconstructed images HR using the BCNN significantly improves the performance of the landmark detector compared to the landmark detection on the low resolution blurred images LR, especially when images are under large blurry effects ($\sigma = 5.0$) or with a very low resolution (15 by 15 pixels). Therefore, the face hallucination using the BCNN is robust to handle large variations in resolutions and blurs.

In FIG. 9B, similar tests are performed using the motion blurs instead of the Gaussian blurs. In this test, the same direction $\theta$ is applied with different moving distance l. Then each image sharing the same kernel is scaled in two different resolutions. As illustrated in FIG. 9B, normalized RMSE are reduced by performing face hallucination using the BCNN. The RMSEs on the reconstructed images HR under Gaussian or motion kernels are close, which indicate face hallucination using the BCNN is robust against blurs.

Figure 10A:
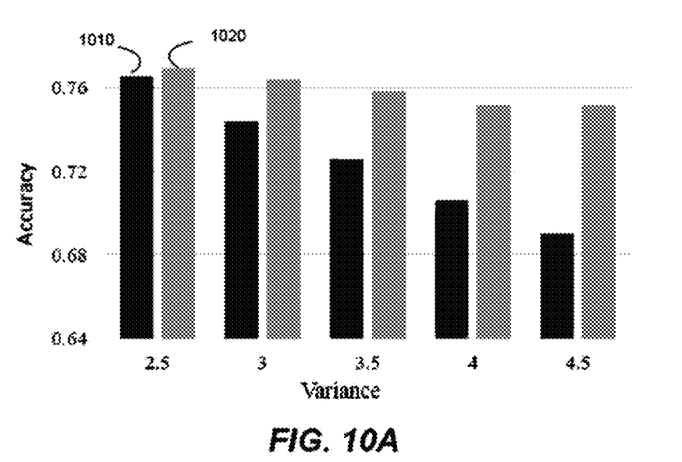
FIG. 10A is a histogram for comparing the performances of face recognition on input images with Gaussian blurs and on hallucinated face images.
Figure 10B:
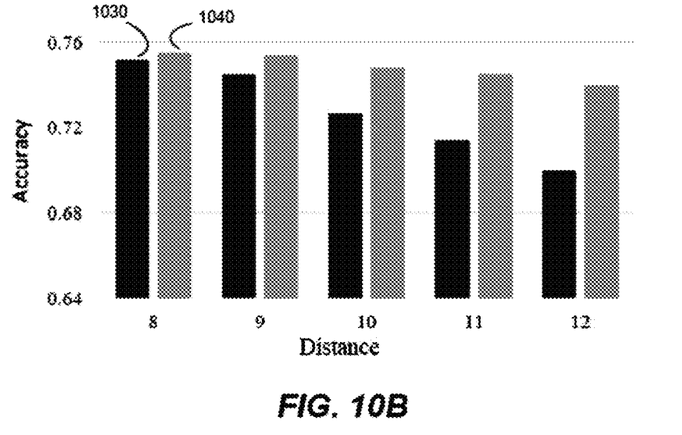
FIG. 10B is a histogram for comparing the performances of face recognition on input images with motion blurs and on hallucinated face images.

FIGS. 10A and 10B illustrate improvements in face recognition using the BCNN. FIG. 10A is a histogram for comparing the performances of face recognition on raw input images with Gaussian blurs and on hallucinated face images. Similarly, FIG. 10B is a histogram for comparing the performances of face recognition on raw input images with motion blurs and on hallucinated face images. In these examples, the face recognition algorithm is described in Yi, D., Lei, Z., Li, S. Z.: Towards pose robust face recognition. In: Computer Vision and Pattern Recognition (CVPR), 2013 IEEE Conference on, IEEE (2013) 3539-3545, although many different types of face recognition could be used.

In FIG. 10A, standard Gaussian filters ($\sigma_x = \sigma_y = \sigma$) with different standard deviations $\sigma = 1.0, 2.0, \ldots, 5.0$ are added on each low resolution image, then the face recognition is performed on the low resolution blurred images and reconstructed images based on face hallucination using the BCNN. For each variance, there are two bars. The left bar 1010 is the accuracy for the low resolution blurred image, and the right bar 1020 is the accuracy of the hallucinated higher resolution image. As illustrated in FIG. 10A, the accuracy of the face recognition on the reconstructed face images 1020 is higher than the accuracy of the face recognition on the low resolution blurred images 1010. Therefore, the face hallucination using the BCNN is robust to handle large variations in resolutions and blurs.

In FIG. 10B, similar tests are performed using the motion blurs instead of the Gaussian blurs. In this test, the same direction $\theta$ is applied with varying moving distance l. The left bar 1030 is the accuracy for the low resolution blurred image, and the right bar 1040 is the accuracy of the hallucinated higher resolution image. As illustrated in FIG. 10B, the accuracy of the face recognition on the reconstructed face images 1040 is higher than the accuracy of the face recognition on the low resolution blurred images 1030. Hence, accuracy of the face recognition is improved by performing face hallucination using the BCNN.

The face hallucination using the BCNN improves the performances of landmark detection and the face recognition. As result, the face hallucination using the BCNN can be implemented as a pre-processing module that significantly improves the performance of the following face applications.

Although the detailed description contains many specifics, these should not be construed as limiting the scope of the invention but merely as illustrating different examples and aspects of the invention. It should be appreciated that the scope of the invention includes other embodiments not discussed in detail above. For example, it should be apparent that different architectures can be used. The specific choices of number of convolution layers, filter sizes, number of channels, choice of non-linearity, choice of down-sampling, representation of the landmarks, etc. will vary depending on the application. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

The term "module" is not meant to be limited to a specific physical form. Depending on the specific application, modules can be implemented as hardware, firmware, software, and/or combinations of these. Furthermore, different modules can share common components or even be implemented by the same components. There may or may not be a clear boundary between different modules.

What is claimed is:

1. A system for generating higher resolution output face images from input face images, the system comprising:
   a convolutional neural network (CNN) that generates a face representation of an input face image, the CNN including convolution, non-linearity and down-sampling;
   a face hallucinator that generates a hallucinated face image from the face representation, the hallucinated face image having a higher resolution than the input face image;
   a coefficient estimator that generates a coefficient from the face representation; and
   a face combiner that combines the hallucinated face image with an up-sampled version of the input face image to produce an output face image, wherein the face combiner generates the output face image as a linear combination of the hallucinated face image and the up-sampled version of the input face image, and the coefficient determines the linear combination,
   wherein the output face image has more texture than the hallucinated face image.

2. The system of claim 1 wherein the face representation is a representation of features in the input face image, and the CNN extracts the features from the input face image.

3. The system of claim 2 wherein the CNN comprises two or more CNN layers in a cascade progressing from lower level features to higher level features.

4. The system of claim 1 wherein the face hallucinator is a neural network that generates the hallucinated face image from the face representation.

5. The system of claim 4 wherein the face hallucinator is a fully-connected neural network.

6. The system of claim 1 wherein the coefficient estimator is a neural network that generates the coefficient from the face representation.

7. The system of claim 6 wherein the coefficient estimator is a fully-connected neural network.

8. The system of claim 1 wherein the up-sampling is based on bicubic interpolation.

9. The system of claim 1 wherein the output face image contains at least four times a number of pixels in the input face image.

10. The system of claim 1 wherein the output face image is at least 100×100 pixels.

11. The system of claim 1 wherein the input face image is not more than 50×50 pixels.

12. The system of claim 1 wherein the output face image compensates for Gaussian blur in the input face image.

13. The system of claim 1 wherein the output face image compensates for motion blur in the input face image.

14. The system of claim 1 further comprising:
   a landmark detection module that detects face landmarks from the output face image.

15. The system of claim 1 wherein:
   the coefficient estimator is a fully-connected neural network; and
   the face hallucinator is a fully-connected neural network that generates the hallucinated face image from the face representation.

16. The system of claim 15 wherein the output face image contains at least four times a number of pixels in the input face image.

17. A method for generating higher resolution output face images from input face images, the method comprising:
   generating a face representation of an input face image;
   generating a hallucinated face image from the face representation, the hallucinated face image having a higher resolution than the input face image;
   generating a coefficient from the face representation;
   up-sampling the input face image; and
   combining the hallucinated face image with the up-sampled input face image to produce an output face image, wherein the output face image is generated as a linear combination of the hallucinated face image and the up-sampled input face image, and the coefficient determines the linear combination,
   wherein the output face image has more texture than the hallucinated face image, and
   wherein the method is performed with one or more processors.

18. A non-transitory computer readable medium configured to store program code, the program code comprising instructions for generating higher resolution output face images from input face images, the instructions when executed by a processor cause the processor to:
   generate a face representation of an input face image;
   generate a hallucinated face image from the face representation, the hallucinated face image having a higher resolution than the input face image;
   generate a coefficient from the face representation;
   up-sample the input face image; and
   combine the hallucinated face image with the up-sampled input face image to produce an output face image, wherein the output face image is generated as a linear combination of the hallucinated face image and the up-sampled input face image, and the coefficient determines the linear combination,
   wherein the output face image has more texture than the hallucinated face image.

* * * * *